Aug. 9, 1932.     C. T. PFLUEGER     1,871,387
WOODEN BAIT AND PROCESS OF MANUFACTURING SAME
Filed Feb. 1, 1929
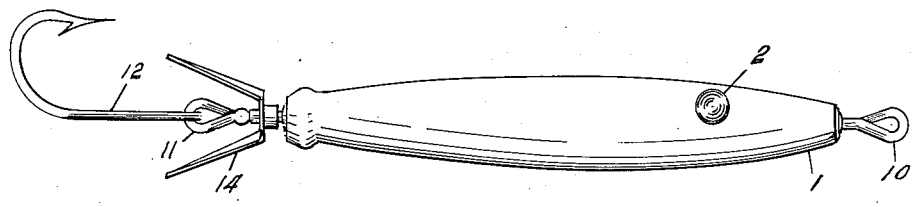
FIG.1.
FIG.2.
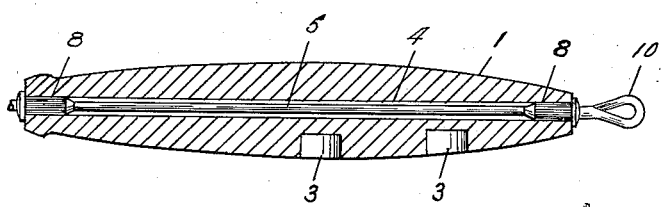
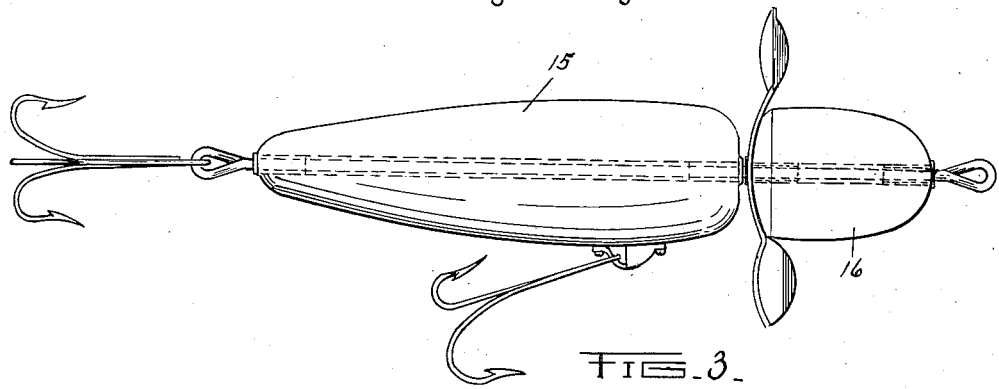
FIG.3.
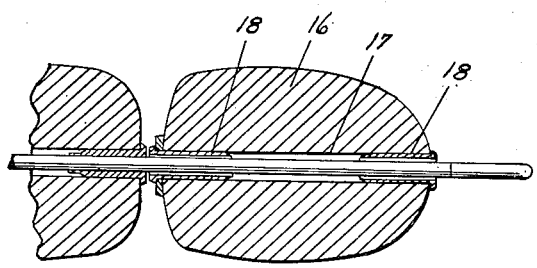
FIG.4.
INVENTOR.
Charles T. Pflueger.
BY Ely & Barrow
ATTORNEYS.

Patented Aug. 9, 1932

1,871,387

UNITED STATES PATENT OFFICE

CHARLES T. PFLUEGER, OF AKRON, OHIO, ASSIGNOR TO THE ENTERPRISE MANUFACTURING COMPANY, OF AKRON, OHIO, A CORPORATION OF OHIO

WOODEN BAIT AND PROCESS OF MANUFACTURING SAME

Application filed February 1, 1929. Serial No. 336,870.

The present invention relates to the manufacture of artificial fishing bait, and particularly to that type of bait having a wooden body provided with attachments for the line at the front of the body and for hooks or lures at the rear of the body. The invention also has for an object the provision of means for mounting bait bodies or sections thereof on a central stem or holder.

In the manufacture of certain types of artificial bait, it is customary to provide a bait body of wood having an attachment at its forward end for the line and having a spinner and hook at the rear end of the bait body. It has been the usual practice to make the attachment at the two ends of the long, narrow body separate and distinct from one another, but this has not been altogether satisfactory owing to the difficulty in obtaining a secure means of fastening onto the body.

It has also been proposed to bore a hole directly through the bait body and to subsequently insert into the hole a long stem or rod to which the attachments are fastened. This method has not been satisfactory owing to the difficulty of boring a small caliber hole through a long body of wood, the bit being easily bent or changed in its direction so that it is impossible to properly direct the boring operation.

The present invention has for its object the devising of a new means and method of making the necessary attachments to the bait body, as will be fully set forth. It will also be observed that the same method may be employed for mounting a revolving bait body portion upon the central stem.

The advantages arising from the present invention will be apparent to those skilled in this art, and it is the purpose of the present application to cover the same as broadly as the limits of the prior art permit within the scope of the claims.

In the drawing:

Figure I is a side view of a wooden minnow having an attachment for the line at the forward end thereof and a combined hook and spinner at the rear thereof, said parts being mounted on the bait body in accordance with the present invention;

Figure 2 is a central section through the bait body;

Figure 3 is a modified form of bait showing the principles thereof as applied to a bait with a revolving wooden head; and Figure 4 is a section through the head.

In the form of the invention shown in Figures 1 and 2, the bait body is indicated by the numeral 1. This body is usually formed of wood and is in the form of a minnow or similarly shaped fish, being painted or decorated to represent a fish and having artificial eyes 2 and ballasts 3 incorporated on its under side.

Through the axis of the body is formed the enlarged passage or hole 4, which extends from the front to the rear of the body, in which is received the central rod or stem 5. It will be observed that the hole 4 is considerably larger than the stem 5, it being possible, by forming the hole of this size, to bore it straight through a bait body and thus avoid the difficulties arising from attempting to drill a hole much smaller or approximately the size of the stem. In fact, by boring the hole with a drill of the larger size, it is possible to direct the boring operation in a straight line and to be assured that it will pass directly from end to end of the bait body.

The stem 5 is held in the proper position centrally of the body by two thimbles or sleeves 8 which fit around the stem and into the open ends of the passageway, the stem being prevented from rotation in the body by soldering to one of the sleeves, and the sleeves being prevented from rotation by roughening or knurling the outer surfaces of the sleeves and driving the sleeves into position so that they grip the wooden body.

The shaft 5 is extended toward the front of the body to prevent an eye 10 for attachment of the line and to the rear of the body to provide an eye 11 for attachment of the hook 12. In the form of bait shown in Figure 1, the eye 11 is spaced from the body to provide a journal for the spinner 14.

In the form of the invention shown in Figures 3 and 4, the main body of the bait 15 is mounted in the same manner as shown in Figures 1 and 2. The forward end of the stem is extended to provide a shaft upon which the revolving head 16 is mounted. In this form of the invention, the passage 17 through the head is enlarged and the sleeves 18, which are secured therein, constitute bearings for the head.

The advantages of the present invention have been briefly referred to. They may be summarized by stating that by the mounting of the stem in the manner described, the manufacturer is assured that the passageway through the bait body is formed along the true axis thereof, this result being accomplished by the use of the enlarged drill. The invention also insures that the central shaft or stem cannot rotate in the bait body, this result being accomplished by the formation of the sleeves or thimbles and the manner in which they are secured in the ends of the bait body together with the soldering of the stem to the sleeves. The invention is economical and the method of manufacture is more efficient than that practiced under the prior art.

What is claimed is:

1. A wooden bait comprising an elongated bait body having a passageway of uniform diameter parallel to the axis thereof, a shaft located in the passageway and of smaller outer diameter than the interior diameter of the passageway, and respective sleeves located in the ends of the passageway and serving to hold the shaft centrally of the passageway, at least one sleeve having non-rotative connection with the bait body and with the shaft.

2. A wooden bait comprising an elongated bait body having a relatively large passageway of uniform diameter parallel to the axis thereof, a shaft located in the passageway and of substantially smaller outer diameter than the interior diameter of the passageway, and respective sleeves located in the ends of the passageway and serving to hold the shaft centrally of the passageway, the sleeves being non-rotative with respect to the bait body and the shaft, the shaft being extended beyond the bait body to provide attachments for the line and the hook.

3. A bait comprising an elongated wooden body having a uniform central passageway formed interiorly thereof along the axis of the body, respective sleeves at the ends of the passageway, said sleeves having roughened exterior surfaces preventing relative angular movement of the sleeves and the body, and a shaft of smaller diameter than the passageway located in the sleeves, the shaft and one of the sleeves being permanently connected together.

4. A bait comprising an elongated wooden body having a uniform central passageway formed interiorly thereof along the axis of the body, respective sleeves at the ends of the passageway, said sleeves having roughened exterior surfaces which engage the body, and a shaft of smaller diameter than the passageway located in the sleeves, the shaft and the sleeves being non-rotatable with relation to each other, the end of the shaft being extended beyond the body and having an eye thereon for attachment of the line.

5. The method of manufacturing wooden baits of the kind described comprising boring a hole along the axis of a bait body, the hole being substantially larger than the shaft to be inserted therein, placing a shaft therein of substantially smaller diameter than the hole, mounting spaced sleeves upon the respective end portions of the shaft, permanently connecting one of the sleeves to the shaft, and then mounting both sleeves in the bait hole in a manner to prevent relative angular movement thereof with relation to the body.

CHARLES T. PFLUEGER.